Patented Aug. 17, 1926.

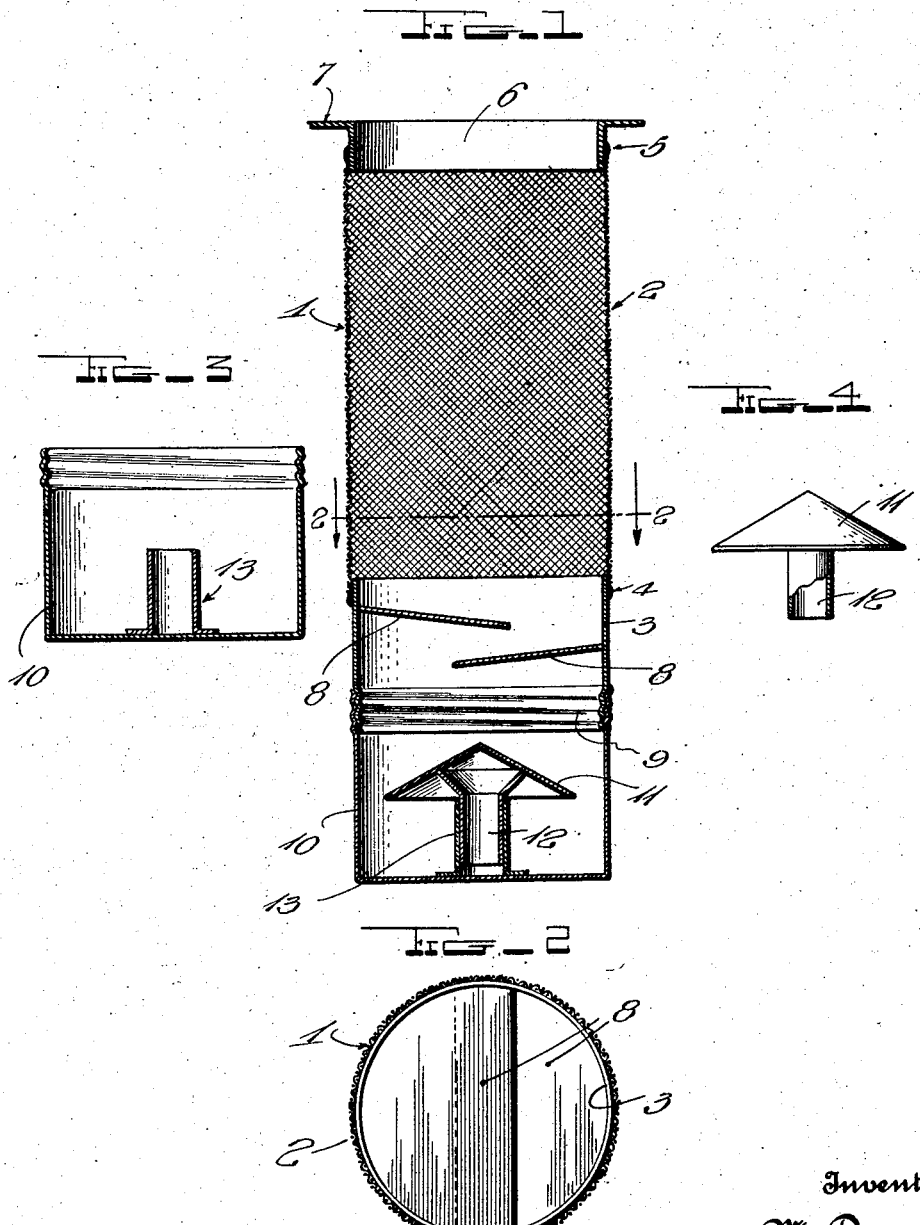

1,596,362

UNITED STATES PATENT OFFICE.

JAMES JOSEPH McDONALD, OF ROSEVILLE, CALIFORNIA.

GASOLINE STRAINER.

Application filed April 17, 1924. Serial No. 707,168.

My invention relates to improvements in devices for straining gasoline or other liquids while they are being discharged into a tank.

The principal object of the invention is to provide a straining device of the type set forth which embodies novel means for collecting any sediment or foreign matter, in a cup at the lower end of the device, and retaining it until the cup is removed and cleaned, provision being made whereby although sediment may reach the cup, it cannot easily rise therefrom and mingle with any liquid being discharged through the strainer.

With the foregoing in view, the invention resides in the novel subject matter hereinafter described and claimed, the description being supplemented by the accompanying drawing.

Figure 1 is a vertical sectional view of a strainer constructed in accordance with my invention.

Figure 2 is a horizontal sectional view on line 2—2 of Fig. 1.

Figure 3 is a vertical sectional view of the removable sediment collecting cup.

Figure 4 is an elevation partly in section, showing the shield which prevents appreciable upward surging of sediment from the collecting cup.

In the drawing above briefly described, the numeral 1 designates a vertically disposed tubular member having an upper straining portion 2, preferably formed of woven wire, and a lower portion 3 in the form of a continuous imperforate wall which is soldered or otherwise secured at 4 to the straining portion 2. The upper end of the member 1 is soldered at 5 or secured in some other suitable way to a collar 6, and said member is adapted to be downwardly inserted through the filling neck of a tank, the collar 6 being formed with an outstanding flange 7 to rest on said neck. This flange may be cut to any desired size and its upper side may be provided with a number of circular guide lines (not shown) to assist in cutting said flange to the necessary size.

Vertically spaced baffle plates 8 have been shown within the wall 3, extending inwardly from opposite sides of said wall and declining toward their inner ends. Below these plates, I have shown the wall 3 formed with screw-threads 9 by means of which a sediment collecting cup 10 is detachably connected with said wall. Within this cup and spaced from its side wall and bottom, is a shield which is preferably in the form of conical plate 11. Secured to and extending downwardly from the center of the plate 11, is an attaching shank 12 which is preferably tubular, said shank being removably received in a short upright tube 13 which is secured to the bottom of the cup 10.

When using the device, the gasoline or other liquid is discharged into the upper end of the member 1, and the portion 2 thereof filters and strains the liquid, so that any water or other foreign matter is trapped in the device and will finally settle between the baffle plates 8 and reach the shield 11. The shape of this shield directs the settling material toward the wall of the cup so that it will descend to the bottom of the latter, and thereafter, said shield has a tendency to prevent upward surging of any sediment. The plates 8 prevent violent agitation of the liquid within the cup 10, when other liquid is being discharged into the upper end of the member 1 and consequently there is no danger of stirring the sediment in the cup and again mixing it with the liquid. From time to time, the entire device may be removed from the tank, the cup 10 detached, the shield 11 removed, and the cup thoroughly cleaned. When reassembled, the device is in readiness for further efficient use.

As excellent results may be obtained from the details disclosed, they may well be followed, but within the scope of the invention as claimed, numerous minor changes may be made.

I claim:

1. In a liquid straining device, a vertically disposed tubular member open at its upper and lower ends and comprising an upper foraminous straining portion and an imperforate continuous wall at the lower end of said straining portion, an imperforate sediment collecting cup detachably connected with the lower end of said wall, baffle plates within said wall to prevent violent agitation of sediment in the cup when discharging liquid into the upper end of the device, a conical shaped shield arranged centrally in said cup and spaced from the bottom thereof, said shield being imperforate and of slightly less diameter than the cup, and means secured to the bottom of the cup to detachably support the shield in its central position above said bottom to prevent appreciable upward surging of the sediment.

2. In a liquid straining device, a vertically disposed tubular member open at its upper and lower ends and comprising an upper foraminous straining portion and an imperforate continuous wall at the lower end of said straining portion; an imperforate sediment collecting cup detachably connected with the lower end of said wall, baffle plates within said wall to prevent violent agitation of sediment in the cup when discharging liquid into the upper end of the device, a short tube secured centrally to and rising from the bottom of said cup, and a shield having a shank removably received in said short tube, said shield being spaced from the bottom and side wall of the cup and being adapted to prevent appreciable upward surging of sediment in said cup.

3. In a liquid straining device, a vertically disposed tubular straining member open at both ends, a sediment collecting cup detachably connected with the lower end of said tubular member, a shield in said cup spaced from the bottom and side wall thereof to prevent appreciable upward surging of the sediment, said shield having a downwardly extending central shank, and a short tube secured to the cup bottom and removably receiving said shank.

4. In a liquid straining device, a vertically disposed tubular straining member open at both ends, a sediment collecting cup detachably connected with the lower end of said tubular member, a shield in said cup spaced from the bottom and side wall thereof to prevent appreciable upward surging of the sediment, said shield being in the form of a conical plate having a downwardly extending shank, and a short tube secured to the cup bottom and removably receiving said shank.

In testimony whereof I have hereunto affixed my signature.

JAMES JOSEPH McDONALD.